Jan. 14, 1969         M. T. OLLIFF, JR., ET AL         3,421,965
        METHOD AND APPARATUS FOR INSTALLING RIGID AFT INSULATION
Filed Oct. 8, 1964              IN ROCKET MOTOR CASES
                                              Sheet __1__ of 5
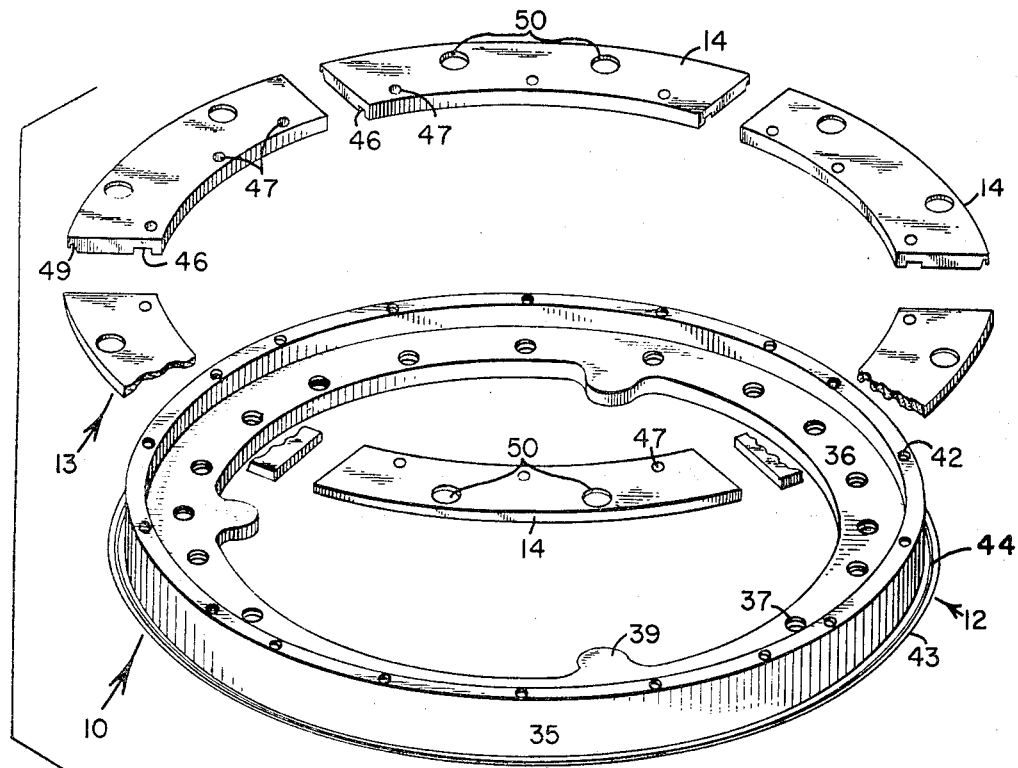
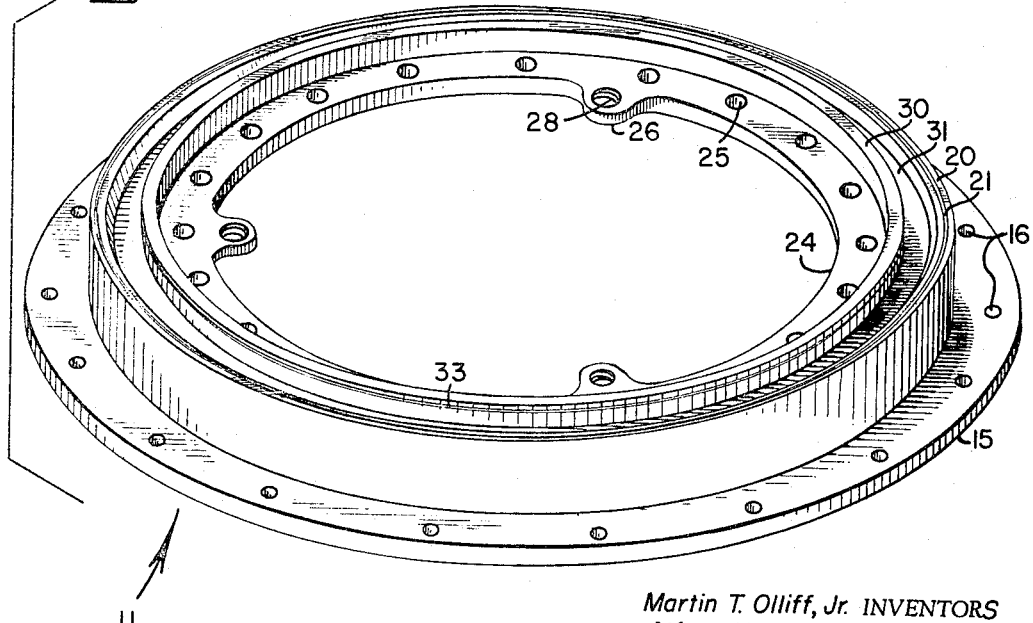
Fig. 1
Martin T. Olliff, Jr. INVENTORS
Alfred H. Hecht
Robert H. Brown
William B. Brooks
BY  ATTORNEY

United States Patent Office 3,421,965
Patented Jan. 14, 1969

3,421,965
METHOD AND APPARATUS FOR INSTALLING RIGID AFT INSULATION IN ROCKET MOTOR CASES
Martin T. Olliff, Jr., Alfred H. Hecht, and Robert H. Brown, Huntsville, and William B. Brooks, Guntersville, Ala., assignors to Thiokol Chemical Corporation, Bristol, Pa., a corporation of Delaware
Filed Oct. 8, 1964, Ser. No. 402,493
U.S. Cl. 156—423          7 Claims
Int. Cl. B32b 1/06

ABSTRACT OF THE DISCLOSURE

An apparatus for installing aft insulation in the aft opening of a rocket motor case including a mounting ring for mounting the apparatus on the rocket motor case, a reservoir in the mounting ring containing a bonding agent, an alignment ring for supporting the aft insulation in the motor case, screw jacks connecting the mounting ring to the alignment ring, the operation of the screw jacks moving the alignment ring into engagement with the mounting ring for the application of the bonding agent to the aft insulation to bond the aft insulation to the motor case.

---

This invention relates to a method and apparatus for installing semi-rigid aft insulation in rocket motor cases and, more particularly, to an apparatus that will contain and apply a bonding agent to the insulation as it is being positioned in the rocket motor case and retain it in this position until the bonding agent has been cured and the insulation has been bonded to the rocket motor case.

Prior to the use of the apparatus embodying the instant invention, it had been found difficult to install the aft insulation in such a manner as to obtain a void-free bonding between the insulation and the rocket motor case. The inadequacy of the bond that resulted between the insulation and the rocket motor case resulted in numerous motor failures as well as separation between the insulation and the rocket motor case while the solid propellant was being cast into the rocket motor case.

It is an object of the invention, therefore, to provide a method and apparatus for installing the aft insulation in a rocket motor case; whereby, in one operation, a bonding agent is applied to the aft insulation and it is properly positioned in the rocket motor case and retained in position until it is bonded to the rocket motor case.

Extremely close tolerances and void-free bonding are obtained by the use of the instant invention, which factors were unobtainable in the past.

The apparatus, as later described, can install a one-piece insulation as well as multi-sectional insulation in a rocket motor case depending upon the requirements that must be met with regard to the shape and size of the rocket motor case.

It is another object of the invention, therefore, to provide a method and apparatus for installing aft insulation in a rocket motor case; whereby the bonding of the insulation to the rocket motor case results in a void-free bond therebetween.

The apparatus is light in weight so that heavy handling equipment is not required; and because of its light weight, an efficient and effective operation can result with the aid of a small operating crew.

The installation of the aft insulation is accomplished before the solid propellant has been cased therein, thus no safety hazards are involved during the operation.

With the above and other objects and advantages in view, the invention consists of the novel details of construction of the apparatus and the specific details of the method involved which will be more fully described and illustrated in the accompanying drawings in which:

FIGURE 1 is a perspective view of the three main parts of the apparatus embodying the invention with certain elements removed for the purpose of clarity in illustrating the invention.

Figure 2:
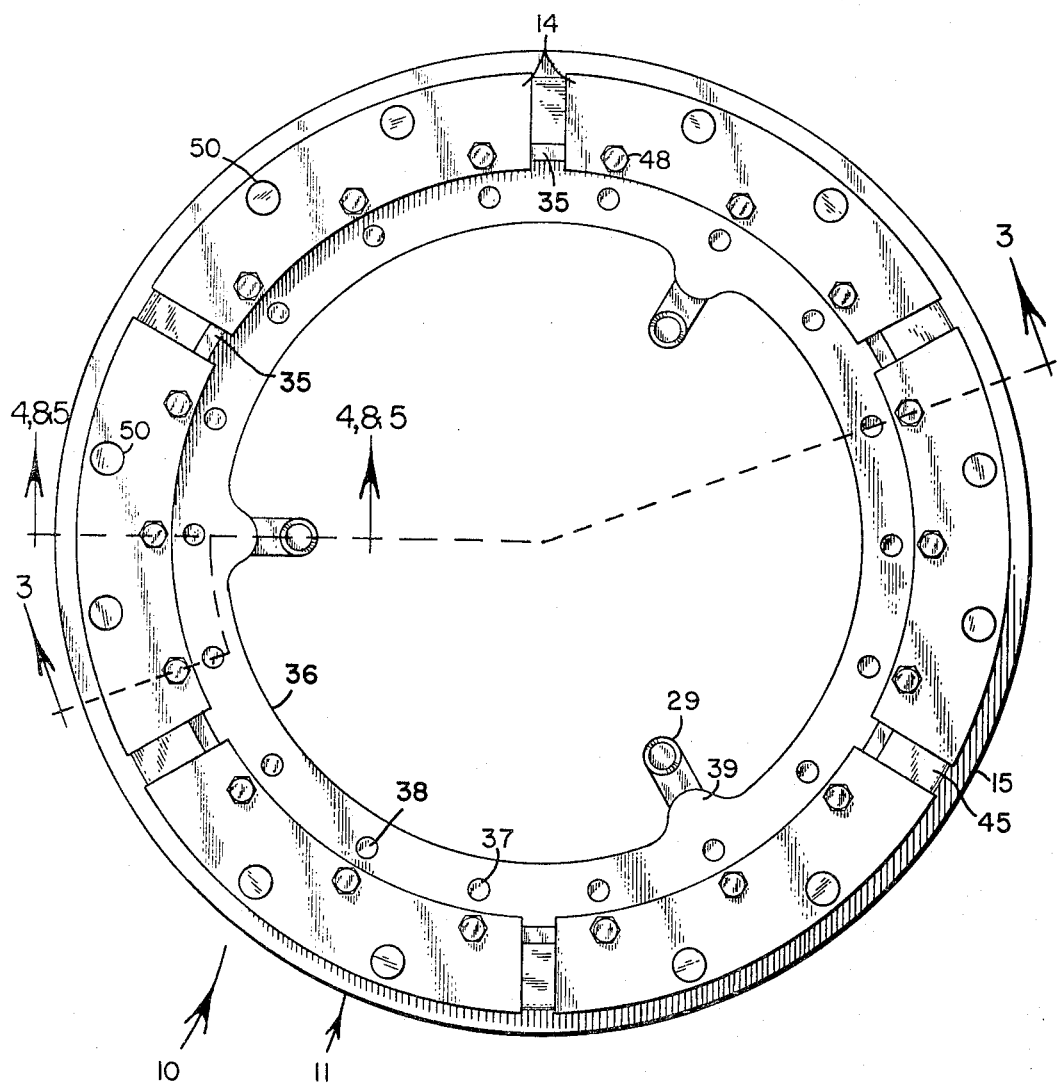
FIGURE 2 is an elevational view of the apparatus as it would appear from the inside of the motor case.
Figure 4:
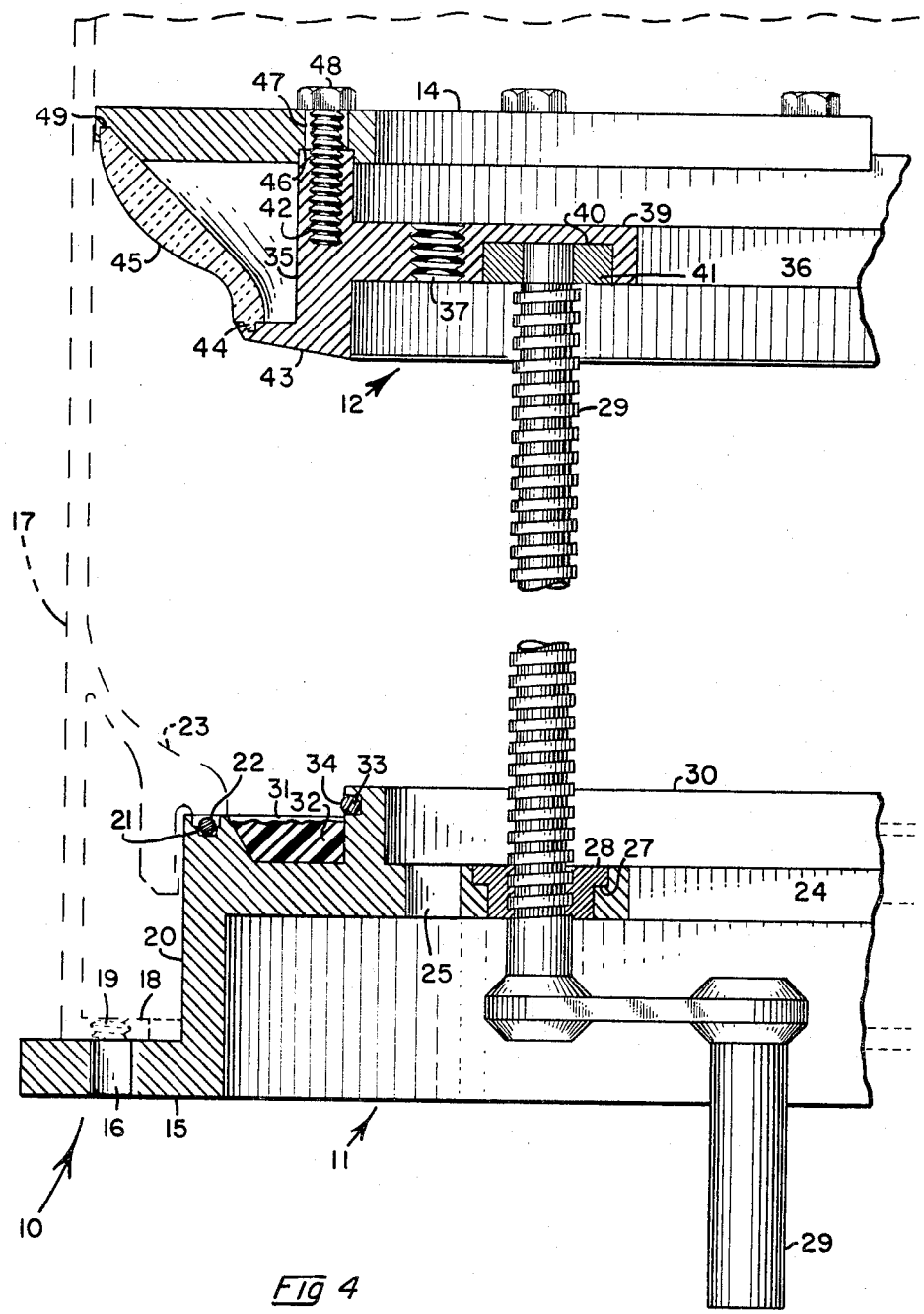
Figure 5:
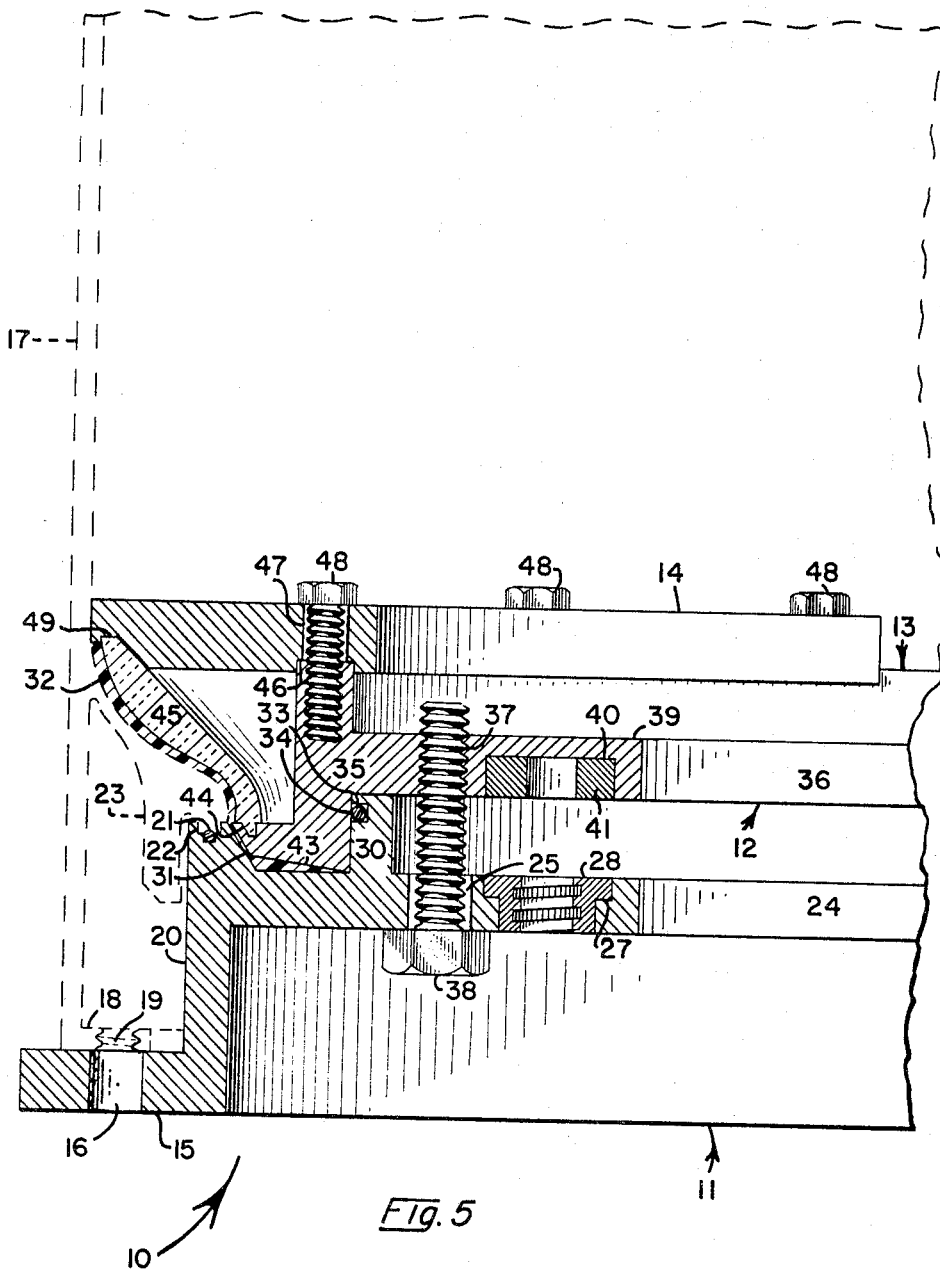

FIGURE 4 is an enlarged detailed fragmentary sectional view taken substantially on the line 4—4 of FIGURE 2 and showing the arrangement of the various elements of the apparatus prior to the positioning of the aft insulation in the motor case, and FIGURE 5 is a view, similar to FIGURE 4, taken substantially on the line 5—5 of FIGURE 2 and showing the apparatus after it has positioned the aft insulation in proper orientation with relation to the motor case.

Referring more in detail to the drawings wherein like parts are designated by like reference numerals, the reference numeral 10 is used to generally designate the apparatus embodying the invention.

The apparatus 10, in its complete assembly, includes three main parts, a mounting ring 11, an alignment ring 12 and an insulation retaining ring 13, which, after machining, is cut into a plurality of segments or feet 14, each of which is identical in physical configuration.

The mounting ring 11 comprises an outwardly-extending circular flange 15 that is provided with a plurality of smooth bores 16 which is positioned on the aft end of a motor case 17, as shown in dotted lines (FIGURES 4 and 5). The motor case 17 has an internally-extending flange 18 that is provided with a plurality of threaded bolt holes 19 that are to be aligned with the smooth bores 16 in the flange 15 of the mounting ring 11 so that, when bolts (not shown) are extended through the smooth bores into the threaded bolt holes 19, the mounting ring 11 will be retained in fixed relation to the motor case 17.

Formed integral with the inner peripheral edge of the flange 15 of the mounting ring 11 in perpendicular relation thereto is a circular band 20 that is provided in its upper peripheral edge with an annular groove 21 in which is positioned a sealing O-ring 22. When the motor case 17 is secured to the mounting ring 11, an inwardly-extending annular projection 23 engages the peripheral edge of the band 20, and the O-ring 22 seals the joint between the mating peripheral edges of the projection 23 and the band 20.

Integral with the band 20 and spaced inwardly of the peripheral edge thereof and extending inwardly therefrom at right angles thereto is a second circular flange 24 which is also provided with a plurality of smooth bores 25 and three inwardly-directed semi-circular projections 26 each of which is provided with a circular seat 27 in which is rigidly secured a threaded bearing 28 in each of which is threadably mounted a jack screw.

Formed integrally with the flange 24 intermediate of the smooth bores 25 and the band 20 in perpendicular relation to the flange 24 is a second circular band 30. The band 20 and the band 30 form therebetween and define an annular reservoir or pocket 31 into which is poured a suitable bonding agent 32; and the surface of the band 30 forming the reservoir 31 has an annular groove 33 therein in which is positioned a second sealing O-ring 34.

The alignment ring 12 comprises a circular band 35, and extending inwardly therefrom at right angles thereto and integral therewith is a circular flange 36. The flange 36 is provided with a plurality of threaded bolt holes 37 which are to be aligned with the smooth bores 25 in the flange 24 of the mounting ring 11 so that, when bolts 38 are extended through the smooth bores 25 into the threaded bolt holes 37, the mounting ring 11 and alignment ring 12 will be retained in rigid fixed relation to each other, FIGURE 5. The flange 36 is also provided with three semi-circular projections 39, each of which is provided with a seat 40 into which is placed a bearing 41; and when the projections 26 on the mounting ring 11 are aligned with the projections 39 on the alignment ring 12, the inner ends of the jack screws 29 are seated in the bearings 41, FIGURE 4.

The upper peripheral edge of the band 35 is provided with a plurality of equally-spaced, threaded bolt holes 42; and extending outwardly from the lower peripheral edge of the flange 36 at right angles thereto and integral therewith is a circular flange 43. The flange 43 is of a size to fit within the reservoir 31 in the mounting ring 11 and is provided adjacent to its peripheral edge with an annular seat 44 which receives one peripheral edge of the aft insulation 45.

Each of the feet 14 is provided with a groove 46 which is adapted to receive the upper peripheral edge of the band 35 and a plurality of smooth bores 47 extend into the groove 46 so that, when the threaded bolt holes 42 in the peripheral edge of the band 35 are aligned with the smooth bores 47, the feet 14 and alignment ring 12 are secured in rigid fixed relation to each other by bolts 48 extending through the smooth bores 47 into the threaded bolt holes 42.

Each of the feet 14 adjacent the outer peripheral edge thereof and on the under surface thereof are provided with a seat 49 which receives the opposite peripheral edge of the aft insulation 45; and each of the feet 14 are also provided with a pair of equally-spaced drain openings 50.

In the installation of the aft end insulation in a rocket motor case, the first step of operation will depend on the size of the insulation. If the rocket motor case and insulation are of a size whereby the insulation may be installed in one piece, it is cut transversely thereof by a diagonal saw cut so that it may be contorted slightly and thus may enter the aft opening of the rocket motor case. It can then return to its normal shape. This is possible because the insulation is of a semi-rigid construction and can be contorted after it has been cut.

If the aft end insulation is too large for easy handling in the manner described, the insulation may be cut into a plurality of sections the size of which will depend on the ease of handling of each section. The internal (non-bonding and non-aligning) surfaces of the insulation may be covered with pressure-sensitive tape to prevent contamination by any overflowing of the bonding agent 32. The protective covering remains on the aft insulation until the operation is complete and the bonding agent 32 has been cured.

Figure 3:
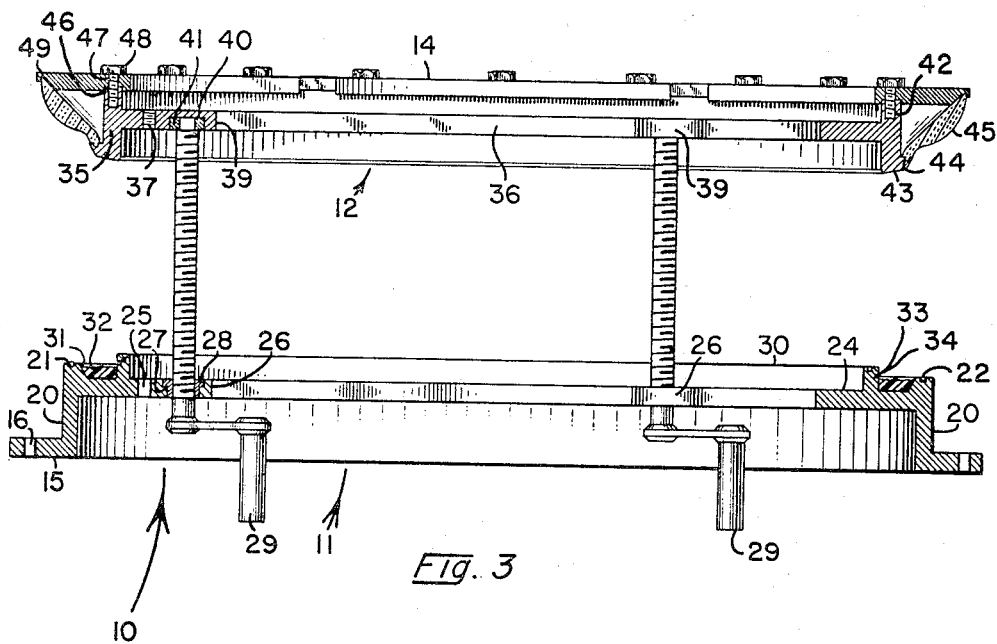
FIGURE 3 is a transverse sectional view taken substantially on the line 3—3 of FIGURE 2 and showing the apparatus in extended position.

In the installation of a one-piece aft end insulation after it has been inserted into the rocket motor case, the jack screws 29 of the apparatus 10 are manipulated until the alignment ring 12 is spaced from the mounting ring 11, as shown in FIGURE 3. The apparatus 10 is then inserted into the aft opening of the rocket motor case 17, and the flange 15 of the mounting ring 11 is engaged with the flange 18 of the rocket motor case 17. The smooth bores 16 in the flange 15 are aligned with the threaded bolt holes 19 in the flange 18; and bolts are extended through the smooth bores 16 into the threaded bolt holes 19 to rigidly fix the apparatus 10 to the rocket motor case 17.

At this time, the rocket motor case 17 may be suspended by an overhead hoist in a vertical position with the aft end opening of the motor case 17 lowermost and raised to a position where it is possible to insert the apparatus 10 at the most efficient height that is available for the operating crew. However, the operation, as previously described, may also be performed with the motor case 17 lying in a horizontal position or resting vertically upon a suitable stand.

The rocket motor case 17 is then lowered until an operator can reach inside of the motor case 17 and position the lower peripheral edge of the aft insulation 45 in the seat 44 in the flange 43 of the alignment ring 12. At this time a curable bonding agent is applied to the edges of the insulation formed by the diagonal cut thereon.

The feet 14 are then placed on the alignment ring 12 so that the seat 49 in each foot engages the upper peripheral edge of the aft insulation 45 and the annular groove 46 in each of the feet 14 receives the upper peripheral edge of the band 35. The smooth bores 47 in each of the feet 14 are then aligned with the threaded bolt holes 42 in the upper peripheral edge of the band 35, and the bolts 48 are then extended through the smooth bores 47 and threadably engaged with the threaded bolt holes 42 and the feet 14 are thus rigidly fixed to the alignment ring 12.

After all of the feet 14 have been secured in place, the bonding agent 32 is poured into the pocket 31 in the mounting ring 11. The jack screws 29 are then manipulated to move the alignment ring 12 downwardly into the position shown in FIGURE 5.

As the flange 43 on the alignment ring 12 moves into the pocket 31, the bonding agent 32 will be forced to flow upwardly between the aft insulation 45 and the motor case 17, as also shown in FIGURE 5. The O-ring 22 will prevent the bonding agent 32 from leaking past the mating surfaces of the band 30 and the flange 35. The jack screws 29 have already aligned the smooth bores 25 in the flange 24 with the threaded bolt holes 37 in the flange 36 so that bolts 38 can now be extended through the smooth bores 25 and be threadably engaged with the threaded bolt holes 37 and the alignment ring 12 will be rigidly fixed to the mounting ring 11.

After all bolts have been threaded into position to retain the various parts of the apparatus 10 in fixed relation to each other, the jack screw 29 may be removed, as shown in FIGURE 5, and the entire motor case 17 with the apparatus 10 rigidly secured thereto will be placed in a suitable oven until the two bonding agents have been completely cured.

The rocket motor case 17 is then removed from the oven and, when it has cooled to normal temperatures, the feet 14 are removed by removing the bolts 48 and the remainder of the apparatus is removed by the removal of the bolts holding the mounting ring 11 to the motor case 17. Any excess bonding agent that remains on the aft insulation 45 may then be removed.

If the aft insulation comprises a plurality of sections, the mounting ring 11 is first secured to the rocket motor case 17 with the apparatus in the condition shown in FIGURE 3, the sections of the aft insulation are positioned in the same manner as previously described for the one-piece aft insulation 45 and further operations for the installation of the sectional aft insulation will proceed as previously described.

The apparatus 10 permits the efficient installation of preformed aft insulation that meets necessary requirements as to shape and size. The apparatus 10 provides the proper installation as to the location of the aft insulation both longitudinally and concentric with the motor case 17 under extremely close tolerances; and the apparatus 10 further provides the efficient application of the bonding agent 32 without the entrapment of air or other defects that may arise during the installation of the aft insulation 45.

It is believed, therefore, that the manner of installing the aft insulation as well as the construction and operation of the apparatus embodying the invention will be clear to those skilled in the art and it is to be understood that any variations in the invention, as described, may be adhered to providing such variations fall within the spirit of the invention and the scope of the appended claims.

Having thus described the invention, what is claimed as new and desired to be secured by Letters Patent is:

1. An apparatus for installing aft insulation in the rocket motor case through the aft opening comprising a mounting ring for securing said apparatus to the motor case in alignment with the aft opening, said mounting ring having a reservoir therein for a bonding agent, an alignment ring for positioing the aft insulation in the rocket motor case, means for retaining the aft insulation on said alignment ring and means for connecting said alignment ring to said mounting ring whereby the alignment ring may be moved into contact with said mounting ring so that the bonding agent is applied to the aft insulation to bond the aft insulation to the rocket motor case.

2. An apparatus for installing aft insulation in a rocket motor case having an aft opening therein comprising means for mounting said apparatus on said rocket motor case in alignment with the aft opening, said mounting means having a reservoir therein for containing a bonding agent, alignment means for supporting the aft insulation in said motor case, means for retaining the aft insulation on said alignment means and means for connecting the alignment means to said mounting means whereby the alignment means is moved into contact with said mounting means so that the bonding agent is applied to the aft insulation to bond the aft insulation in the motor case.

3. An apparatus, as in claim 2, wherein said mounting means comprises a circular ring, means is provided for rigidly securing said circular ring to the rocket motor case and means is provided for rigidly securing said alignment means to said mounting means.

4. An apparatus, as in claim 2, wherein said alignment means comprises a circular ring having a depending flange thereon that seats in the reservoir on said mounting means to force the bonding agent therein onto the aft insulation.

5. An apparatus, as in claim 4, wherein the depending flange is provided with an annular seat therein to receive the peripheral edge of the aft insulation.

6. An apparatus, as in claim 2, wherein the means for retaining the aft insulation on said alignment means comprises a plurality of segmented sections, each of said sections having a seat therein to receive the peripheral edge of the aft insulation and means is provided for rigidly securing said segmented sections to said alignment means.

7. An apparatus, as in claim 2, wherein the means for connecting said alignment means to said mounting means comprises a plurality of rotatably mounted jack screws.

References Cited

UNITED STATES PATENTS

| 2,423,869 | 7/1947 | Blessing | 156—60 X |
| 3,043,147 | 7/1962 | Will | 156—64 X |

FOREIGN PATENTS

| 819,471 | 9/1959 | Great Britain. |

DOUGLAS J. DRUMMOND, *Primary Examiner.*

U.S. Cl. X.R.

60—271